United States Patent
Islam et al.

(10) Patent No.: US 12,217,398 B1
(45) Date of Patent: Feb. 4, 2025

(54) APPARATUS AND METHOD FOR SINGLE IMAGE DEHAZING CONSIDERING HAZE TYPE CLASSIFICATION

(71) Applicant: IMAM MOHAMMAD IBN SAUD ISLAMIC UNIVERSITY, Riyadh (SA)

(72) Inventors: Md Tanvir Islam, Riyadh (SA); Ik Hyun Lee, Riyadh (SA); Abdul Khader Jilani Saudagar, Riyadh (SA); Abdullah Altameem, Riyadh (SA); Mohammed Abaoud, Riyadh (SA); Khan Muhammad, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/658,673

(22) Filed: May 8, 2024

(51) Int. Cl.
*G06T 5/60* (2024.01)
*G06T 5/73* (2024.01)
(Continued)

(52) U.S. Cl.
CPC ............ *G06T 5/60* (2024.01); *G06T 5/73* (2024.01); *G06V 10/764* (2022.01);
(Continued)

(58) Field of Classification Search
CPC ... G06T 5/60; G06T 5/73; G06T 2207/10032; G06T 2207/20081; G06T 2207/20092;
(Continued)

(56) References Cited

U.S. PATENT DOCUMENTS

2011/0135200 A1  6/2011 Chen et al.
2016/0005152 A1* 1/2016 Yang .................. G06T 5/73
                                                        382/275
(Continued)

FOREIGN PATENT DOCUMENTS

CN    111815528 A     10/2020
JP    2022548712 A  * 11/2022
(Continued)

OTHER PUBLICATIONS

Pei, Y., et al., "Classification-driven Single Image Dehazing", Journal of Latex Class Files, vol. 14, No. 8, 2015, pp. 1-8.
(Continued)

*Primary Examiner* — Samir A Ahmed
(74) *Attorney, Agent, or Firm* — Oblon, McClelland, Maier & Neustadt, L.L.P.

(57) ABSTRACT

A system for intelligent image dehazing based on haze type classification. The system receives a hazy image and classifies the haze type using either a Single Selective Classifier (SSC) or a Hybrid Conditional Classifier (HCC), based on user preference. If SSC is selected, a specific single model is used for classification. If HCC is selected, all pre-trained and pre-defined models are used. The system then selects a suitable specialized dehazer based on the predicted haze type and applies it to the input image to mitigate the effects of the haze. The system is flexible, allowing for adjustments to various parameters as per the users' requirements and target application domains.

12 Claims, 13 Drawing Sheets

(51) Int. Cl.
*G06V 10/70* (2022.01)
*G06V 10/764* (2022.01)
*G06V 10/774* (2022.01)
*G06V 10/94* (2022.01)
*G06V 20/50* (2022.01)

(52) U.S. Cl.
CPC ............ *G06V 10/774* (2022.01); *G06V 10/87* (2022.01); *G06V 10/945* (2022.01); *G06V 20/50* (2022.01); *G06T 2207/10032* (2013.01); *G06T 2207/20081* (2013.01); *G06T 2207/20092* (2013.01); *G06T 2207/30181* (2013.01); *G06T 2207/30232* (2013.01); *G06T 2207/30252* (2013.01)

(58) Field of Classification Search
CPC . G06T 2207/30181; G06T 2207/30232; G06T 2207/30252; G06V 10/764; G06V 10/774; G06V 10/87; G06V 10/945; G06V 20/50
See application file for complete search history.

(56) References Cited

U.S. PATENT DOCUMENTS

| | | |
|---|---|---|
| 2016/0247034 A1 | 8/2016 | Lee et al. |
| 2016/0293138 A1 | 10/2016 | Zhang |
| 2020/0285883 A1* | 9/2020 | Hiasa .................. G06F 18/2148 |
| 2022/0210350 A1* | 6/2022 | Chondro .................. G06T 5/60 |
| 2023/0179772 A1* | 6/2023 | Nakamura ............. H04N 23/76 382/156 |
| 2023/0406286 A1* | 12/2023 | Vovos .................. B60W 20/50 |

FOREIGN PATENT DOCUMENTS

| | | | |
|---|---|---|---|
| KR | 20220032409 A | * | 3/2022 |
| KR | 10-2514531 B1 | | 3/2023 |

OTHER PUBLICATIONS

Pei, Y., et al., "Does Haze Removal Help CNN-based Image Classification?", ECCV, Computer Vision Foundation, 2018, 16 total pages.

* cited by examiner

APPARATUS AND METHOD FOR SINGLE IMAGE DEHAZING CONSIDERING HAZE TYPE CLASSIFICATION

BACKGROUND

Technical Field

The present disclosure generally pertains to the field of image processing and computer vision. In particular, the present disclosure relates to an apparatus and a method for classifying and dehazing images.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In image processing, the pervasive challenge of atmospheric haze is a considerable impediment to the clarity and fidelity of photographic images. Haze is a condition in an uncertain environment when visibility reduces due to fog, clouds, air pollution, or any unexpected airborne particles. In other words, haze is an aggregation of airborne particles and moisture that distorts the transmission of light and consequently degrades the quality of images by reducing contrast, shifting colors, and obscuring details. Such degradation impacts the aesthetic appeal of images and hampers the performance of various image processing and computer vision applications, ranging from autonomous navigation systems to remote sensing and surveillance operations. To address this issue, dehazing algorithms are developed that aim to remove or mitigate the effects of haze in images, which is one focus of the present disclosure.

Accordingly, it is one object of the present disclosure to provide methods and systems for intelligently predicting the haze types in a single input image. It is an object of the present disclosure to provide methods and systems for classifying haze types and applying specialized dehazing based on a diverse dataset and Federated Learning. It is also an object of the present disclosure to utilize advanced deep learning algorithms for classifying and dehazing images. Another object of the present disclosure is a method and system to train dehazers locally from different servers. Another object of the present disclosure is to provide a system that is flexible and the number of pre-defined models, the intensity levels, number of classifiers, and the types of haze can be adjusted as per the users' requirements and target application domains. It is another object of the present disclosure to provide a method and system with benchmarks for several application domains, such as objection detection, segmentation, super-resolution, and context analysis.

SUMMARY

In an exemplary embodiment, the present disclosure discloses method of dehazing an image having a haze condition and a haze-type class. The method comprises generating a hazy dataset having a plurality of ground truth images and a plurality of transitioned hazy images having a plurality of haze conditions. Further, the method comprises training a plurality of haze-type classifier models and a plurality of dehazer models with the hazy dataset, wherein the plurality of dehazer models includes a plurality of specialized dehazer models. In addition, the method comprises selecting a classifier model from the plurality of haze-type classifier models to predict the haze-type class of the image by the classifier model. The method further comprises selecting a dehazer from the plurality of specialized dehazer models based on the haze-type class. Thereafter, the method comprises dehazing the image by removing the haze condition with the dehazer.

In an exemplary embodiment, selecting the classifier further comprises prompting a user to select a classifier selector to obtain a selected classifier selector including the plurality of haze-type classifier models. Selecting the classifier also comprises processing the image in accordance with a requirement of each haze-type classifier model of the plurality of haze-type classifier models of the selected classifier selector to obtain a processed image. Further, an inference is generated on the processed image with the classifier model selected from the plurality of haze-type classifier models based on the selected classifier selector to predict the haze-type class of the image by the classifier model.

In an exemplary embodiment, the classifier selector is selected from the group consisting of a single selective classifier (SSC) and a hybrid conditional classifier (HCC).

In an exemplary embodiment, generating the hazy dataset further comprises creating one or more image sets by splitting the plurality of ground truth images. The one or more image sets include an outdoor image set, a street image set, a farmland image set, and a satellite image set, each comprising a subset of ground truth images. For each image set of the one or more image sets, transitioning the subset of ground truth images by overlaying a synthetic haze condition to obtain the plurality of transitioned hazy images having the plurality of haze conditions. The synthetic haze condition includes a haze intensity level.

In an exemplary embodiment, the plurality of haze conditions of the plurality of transitioned hazy images includes a cloud, a fog, an environmental haze, and a rain.

In an exemplary embodiment, the plurality of haze conditions of the plurality of transitioned hazy images in the outdoor image set, the street image set, and the farmland image set further includes a smoke condition.

In an exemplary embodiment, the plurality of specialized dehazer models includes a cloud dehazer, a fog dehazer, an environmental haze dehazer, a smoke dehazer, and a rain dehazer.

In an exemplary embodiment, the classifier selector is the SSC, wherein the prompting further comprises prompting the user to select a single model from the plurality of haze-type classifier models and wherein the classifier model is the single model.

In an exemplary embodiment, the classifier selector is the HCC and the generating the inference further comprises generating an HCC information including a first vector set containing predicted classes, a second vector set containing prediction probabilities, a number of classes (N), and a number of haze-type models (M) for each haze-type classifier model of the plurality of haze-type classifier models with the inference. The generating the inference also comprises passing the HCC information for each haze-type classifier model of the plurality of haze-type classifier models through a condition block to obtain a final predicted class. Thereafter, the final predicted class is selected as the classifier model.

In an exemplary embodiment, the condition block comprises a first condition block, a second condition block, a third condition block, a fourth condition block, and a fifth condition block.

In an exemplary embodiment, the first condition block having a first condition is configured to pass the HCC information for each haze-type classifier model of the plurality of haze-type classifier models to the first condition block. The condition block having the first condition is further configured to determine whether the first condition is satisfied for each haze-type classifier model of the plurality of haze-type classifier models. In response to the determining whether the first condition is satisfied, when the first condition is satisfied, the first condition block is configured to pass the HCC information for each haze-type classifier model of the plurality of haze-type classifier models to the third condition block. In response to the determining whether the first condition is satisfied, when the first condition is not satisfied, the first condition block is configured to pass the HCC information for each haze-type classifier model of the plurality of haze-type classifier models to the second condition block. In an example, the first condition is represented by a first equation of $$\text{Count}(C^*) = \frac{N}{M},$$

wherein the C* represent the haze-type class.

In an exemplary embodiment, the second condition block having a second condition is configured to determine whether the second condition is satisfied for each haze-type classifier model of the plurality of haze-type classifier models. In response to the determining whether the second condition is satisfied, when the second condition is satisfied, the second condition block is configured to pass the HCC information for each haze-type classifier model of the plurality of haze-type classifier models to the third condition block. Further, in response to the determining whether the second condition is satisfied, when the second condition is not satisfied, the second condition block is configured to pass the HCC information for each haze-type classifier model of the plurality of haze-type classifier models to the fourth condition block. In an example, the second condition is represented by a second equation of $$P_{i,PC_i} = \frac{1}{N},$$

wherein the $P_{i,PC_i}$ represents the prediction probabilities, wherein the i is a first haze-type classifier model index and $PC_i$ is a predicted class of an $i^{th}$ haze-type classifier model.

In an exemplary embodiment, the third condition block is configured to determine the final predicted class based on the second vector of the HCC information.

In an exemplary embodiment, the fourth condition block having a fourth condition is configured to determine whether the fourth condition is satisfied for each haze-type classifier model of the plurality of haze-type classifier models. In response to the determining whether the fourth condition is satisfied, when the fourth condition is satisfied, the fourth condition block is configured to pass the HCC information for each haze-type classifier model of the plurality of haze-type classifier models to the fifth condition block. In response to the determining whether the fourth condition is not satisfied, when the fourth condition is not satisfied, the fourth condition block is configured to pass the HCC information for each haze-type classifier model of the plurality of haze-type classifier models to the third condition block. The fourth condition is represented by a third equation of $P_{i,j} \neq P_{i,k}$, wherein the j is a first predicted class index and k is a second predicted class index and wherein j≠k.

In an exemplary embodiment, the fifth condition block is configured to determine the final predicted class based on an accuracy of the plurality of haze-type classifier models.

In an exemplary embodiment, the training is performed on a local server, wherein the local server is communicatively connected to a global federated server configured for a federated learning.

In an exemplary embodiment, the image is obtained from an autonomous vehicle having a camera or from a surveillance camera.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
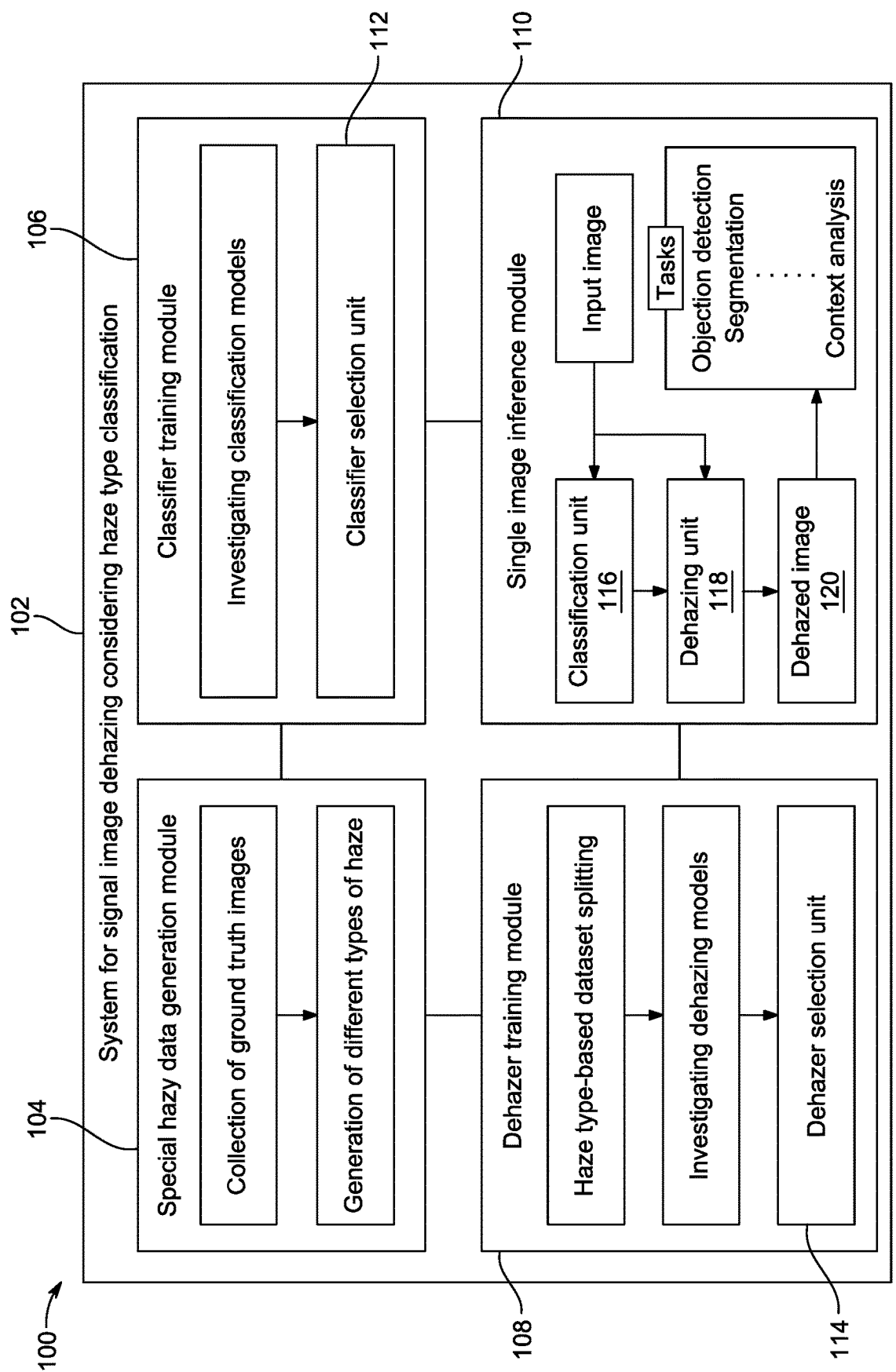
FIG. 1 depicts a schematic diagram for dehazing a single image, incorporating a classification of haze types, according to certain embodiments.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Existing methods and datasets for image dehazing aim to mitigate visibility issues in images affected by atmospheric disturbances. However, traditional datasets often lack diversity in haze types and intensity levels, which limits the development of robust dehazing techniques. For example, in the last decade one of the benchmarking datasets in the field of single image dehazing features a huge number of hazy images from both indoor and outdoor scenes. Instead of having many images with varying haze types, the dataset only features one kind of haze type. Another research team introduced a realistic foggy driving dataset that features fog hazy scenes from the driver's point of view. The dataset only includes four specific levels of fog haze, which restricts its ability to cover a broader spectrum of atmospheric hazy conditions in a detailed manner. Another database comprises 90 synthetic images spanning 18 urban road scenes, and its successor adds 330 images covering 66 diverse road situations. Although these databases fulfill a specific need, the synthetic nature of their imagery restricts their usefulness in mimicking the intricacies and variations found in real-life settings. This limitation potentially affects their utility and efficacy in comprehensive evaluations of algorithms in real-world conditions. Considering the cloud type haze for the aerial and satellite images, researchers also introduce some other datasets that contain the images where cloud type haze is present. Apart from these, the other datasets contain non-homogeneous haze. The common limitation is that all of these datasets provide only a single type of haze, mostly limited to fog, cloud or some other unspecified haze type which limits further haze type classification. Due to these reasons, despite many works (discussed in the next few paragraphs) in literature with single image dehazing, conventional datasets and methods are unable to provide haze type classification with intelligent dehazing.

Distinguishing itself from traditional approaches that typically neglect image detail during dehazing, the problem of detail loss has been addressed by treating dehazing and detail refinement as separate but complementary tasks. A haze residual attention sub-network for effective haze removal can be integrated with a detail refinement sub-network for enhancing image details. Another approach distinguished between meteorological and environmental haze, highlighting the misclassification issues in current haze assessments. An advancement lies a refined methodology for accurately identifying haze types, crucial for targeted air quality management in China. The work primarily focuses on distinguishing between these two types of haze to improve the accuracy of haze day identification and air quality management, rather than presenting a method for haze removal in images or mitigation based on this classification. Yet another research introduced a concept of identifying hazy and non-hazy images before passing them to a dehazer to save processing time. Another approach to hazy image classification and dehazing uses a mean channel prior (MCP) within a deep learning framework. Apart from these, many techniques have been introduced by different research teams for single image dehazing. However, these models mostly limit dehazing to only one kind of hazy image. Conventional methods and systems are unable to consider different types of haze and dehaze an image based on the haze type. Another approach includes classifying images into haze-free, light haze, or dense haze before applying targeted dehazing techniques. This method improves dehazing performance both subjectively and objectively, offering a significant advancement for applications like autonomous driving and image recognition.

Conventional methods are for generalized dehazing tailored to specific types of hazy images. However, atmospheric haze in nature varies a lot depending on different situations, e.g., fog in winter, rain drops in rainy season, environmental haze for carbon emission, wildfire smoke and cloud for the aerial images.

An intelligent dehazing system that considers haze type classification is described herein. The specialties of the system and method of the present disclosure include characteristics such as 1) a single image haze type classification, 2) specialized dehazers that are trained for dehazing a particular haze type images, 3) a concept dataset structure which is suitable for training the haze type classification models and specialized dehazers, 4) Federated Learning assisted specialized dehazers training with data privacy, 5) intelligent technique to pick a suitable dehazer identifying the haze type presents in the input image 6) single model classification where the classification model can be defined by the user, and 7) a unique hybrid conditional classifier that incorporates multiple classification models for accurate haze type classification. The method and system of the present disclosure render it apt for application in practical settings, enabling smart dehazing of input hazy images by considering the classification of haze types.

The present disclosure provides an advanced solution to the challenge of image dehazing by generating a comprehensive hazy dataset and leveraging a dataset to perform intelligent dehazing with specialized dehazers that consider haze type classification in an input hazy image. One aspect of this method and system lies in its approach to utilizing haze-type classification to inform the dehazing process. By identifying the specific type of haze present in an image, the system can apply a tailored dehazing algorithm designed to handle that particular haze type, leading to superior dehazing outcomes. Extensive benchmarking against state-of-the-art classification models has demonstrated that the method and system of the present disclosure achieve impressive accuracy rates, significantly outperforming existing generalized dehazing methods. Furthermore, the present disclosure includes a suite of dehazing algorithms, each fine-tuned for specific haze conditions, called specialized dehazers. Considering the Federated Learning (FD) approach, the present disclosure describes a system so that users can train the specialized dehazers locally from different servers and the weights of the models can integrate with the invented system. The invention offers considerable potential to enhance various applications in computer vision, particularly those where clarity of vision is paramount for performance, such as in autonomous vehicle navigation and security surveillance systems.

FIG. 1 depicts a schematic diagram for dehazing a single image, incorporating a classification of haze types, according to certain embodiments of the present disclosure. FIG. 1 depicts a block diagram 100 of a system 102 for single image dehazing considering haze type classification. The block diagram 100 is divided into two main sections, each detailing a different aspect of the system 102. The system 102 includes a special hazy data generation module 104 (hereinafter referred to as "data generation module 104"), a classifier training module 106, a dehazer training module 108, and a single image inference module 110 (hereinafter referred to as "inference module 110"). The data generation module 104 is responsible for collecting ground truth images and generating a hazy dataset, which includes a plurality of ground truth images and a plurality of transitioned hazy images with various haze conditions.

The hazy dataset may be provided as an input to the classifier training module 106 and the dehazer training module 108. The classifier training module 106 investigates multiple classification models and trains them using the hazy dataset to accurately predict the haze-type class of an image. The trained classification models are stored in the system 102. Thereafter, a classifier selection unit 112 of the system 102 may select an appropriate classifier model from the trained haze-type classifier models to predict the haze-type class of the input image. The dehazer training module 108 may split the hazy dataset based on the types of haze. Thereafter, the dehazer training module 108 may investigate multiple dehazing models and train the dehazing models to accurately dehaze an image. The trained dehazing models are stored in the system 102. Thereafter, a dehazer selection unit 114 of the system 102 may select an appropriate dehazing model from the trained models to dehaze the input image.

Thereafter, the inference module 110 may process the input image through the selected classifier model to generate an inference on the haze type present in the image. The system 102 also includes a classification unit 116 in communication with the inference module 110. Based on the inference from the classifier model, the classification unit 116 may determine the haze-type class of the input image. Once the haze type is classified, a dehazing unit 118 of the system 102 may select the corresponding specialized dehazer model and apply it to the input image to remove the haze condition. The final output of the system 102 is the clear, dehazed image 120 that has been processed by the specialized dehazer model. The relationship between the elements indicates a sequential process where the input image is classified according to the haze type, and then a specialized dehazing process is applied to produce a clear image.

Figure 2:
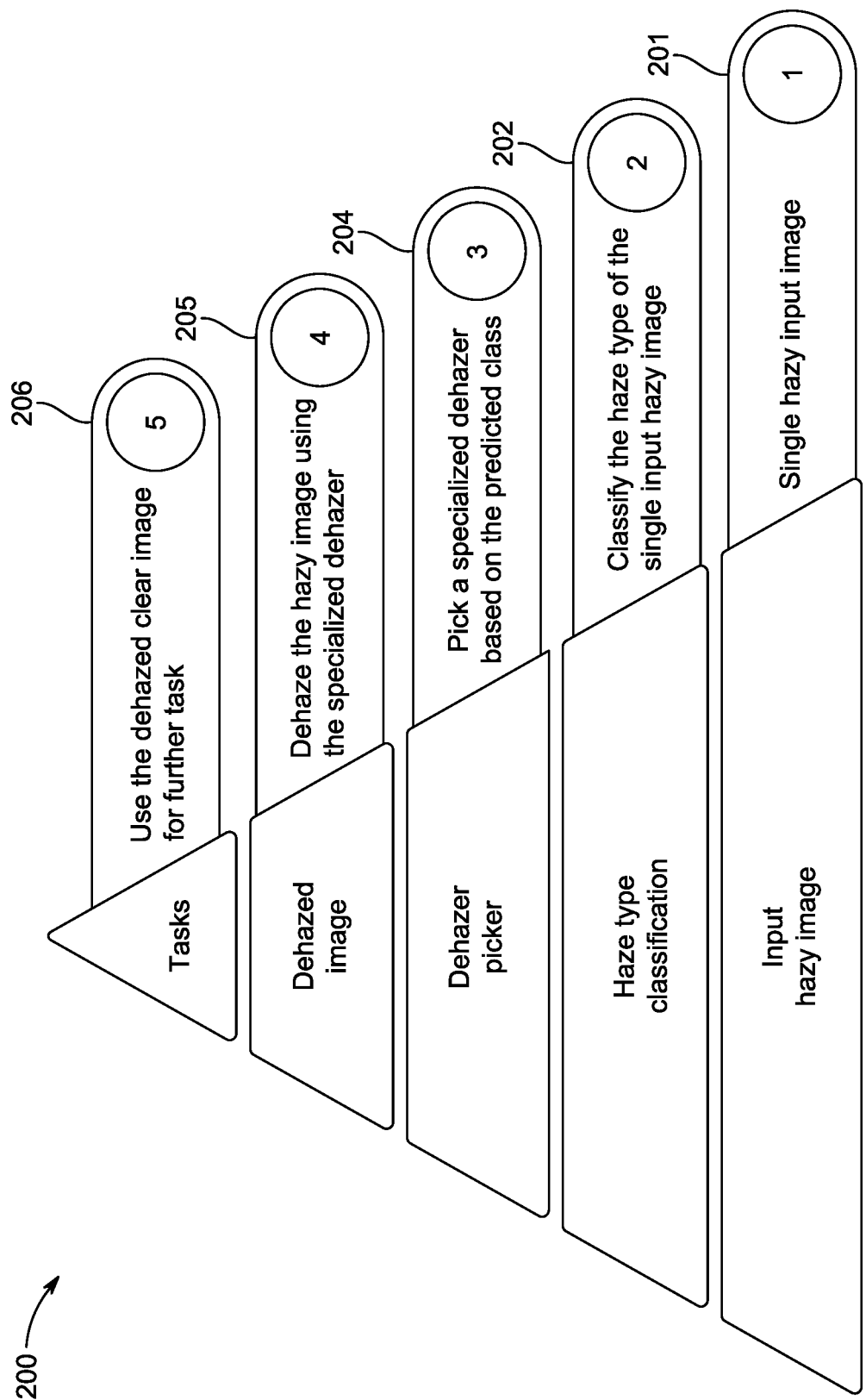
FIG. 2 depicts a systematic procedure implemented by a dehazing system, according to certain embodiments.

FIG. 2 depicts a systematic procedure implemented by a dehazing system, according to certain embodiments. FIG. 2 depicts a flowchart 200 of a method for dehazing a single hazy input image. The flowchart 200 begins with a single hazy input image provided at step 201. At step 202, the single hazy input image undergoes haze type classification to determine and classify the type of haze present. Depending on user-defined settings, the system 102 employs either a Single Selective Classifier (SSC) or Hybrid Conditional Classifier (HCC) classification approach to identify the type of haze in the input image. Based on this classification, a specialized dehazer selection is made, choosing the appropriate dehazing algorithm, as depicted at step 203. At step 204, the selected specialized dehazer then processes the image to remove the haze and to clarify the input hazy image. Finally, at step 205, the dehazed image may be used for various tasks thereby representing the application of the clarified image in various tasks, such as surveillance or autonomous vehicle navigation.

Figure 3:
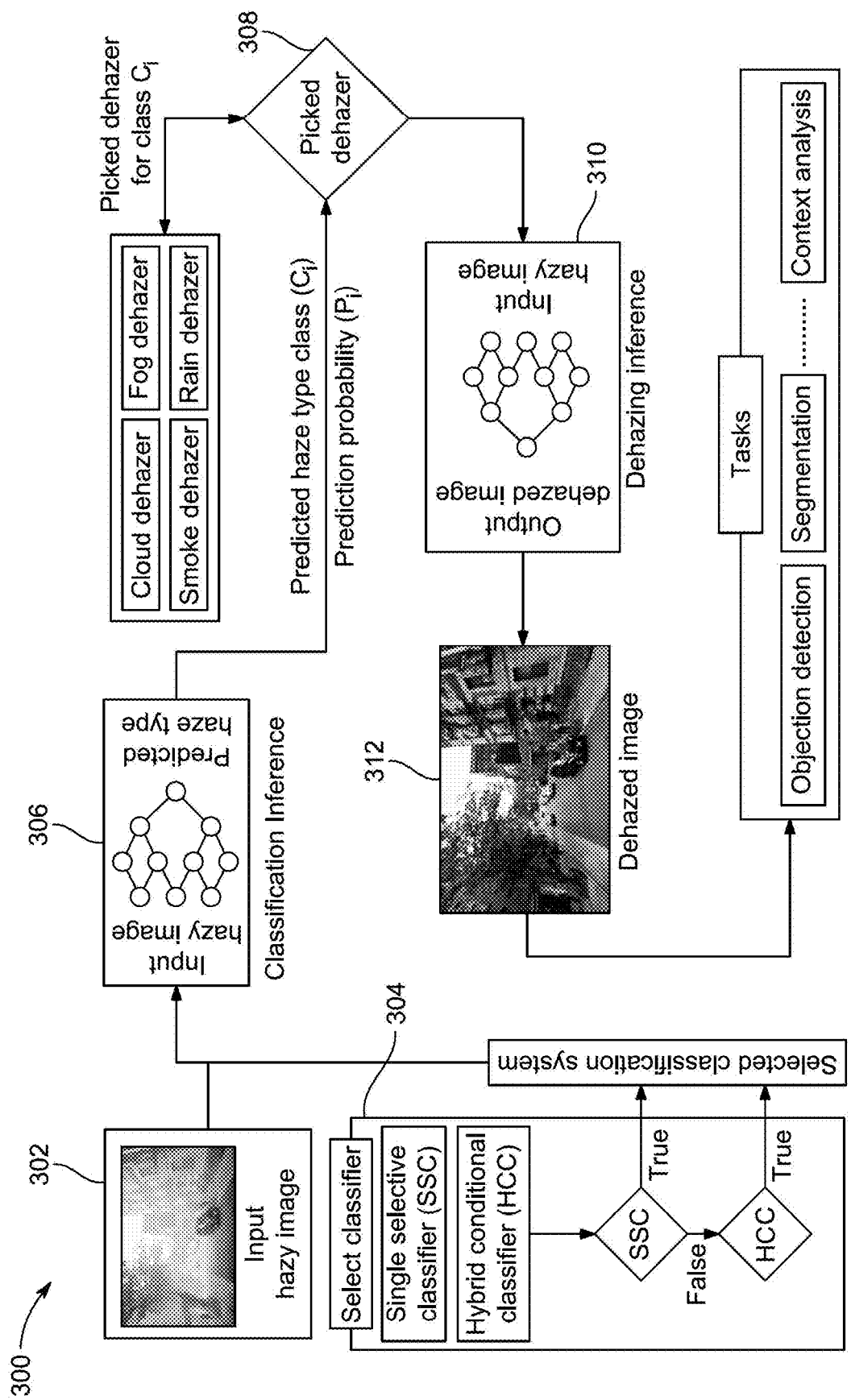
FIG. 3 depicts a comprehensive architecture of a dehazing system, according to certain embodiments.

FIG. 3 depicts a comprehensive architecture 300 of a dehazing system, according to certain embodiments. The architecture 300 starts by inputting hazy image 302 for being processed. The architecture 300 further includes a classifier selection step 304. At this step, a classification module may select one of the classification models, Single Selective Classifier (SSC) or Hybrid Conditional Classifier (HCC), based on user preference for classifying the haze type present in the input image. In some cases, if the user selects SSC, the dehazing system may ask the user to select a specific single model to use for classification. The dehazing system may process the input image as per the requirements of the selected model and pass the input hazy image through the selected model of SSC for inference. The selected model of SSC may provide inference on the processed input image and output the predicted haze type present in the input image. In other cases, if the user selects HCC, the dehazing system may use all pre-trained and pre-defined models. The dehazing system may process the input image as per the requirements of the models defined in the HCC and pass the processed input image through all the defined models of HCC. The dehazing system may then generate inference on the processed input image using the models of HCC and output a set of vectors of the predicted classes and prediction probabilities. The dehazing system may pass these outputs through the Condition Block of the HCC to check which condition is satisfied. As is evident from FIG. 3, at the classification inference stage 306, the dehazing system may output a final predicted class as the haze type present in the input image.

Furthermore, at step 308, based on the predicted class of the haze type in the input image, the architecture 300 may determine which specialized dehazer has been picked by a dehazer unit. The specialized dehazer may encompass a set of dehazers tailored for specific haze types, such as fog, rain, cloud, and smoke. In some embodiments, the cloud refers to atmospheric formations composed of tiny water droplets or ice crystals suspended in the air. They play a crucial role in regulating the Earth's climate by reflecting sunlight, absorbing heat, and influencing precipitation patterns. Clouds come in various shapes and sizes, ranging from wispy cirrus clouds high in the sky to dense cumulonimbus clouds associated with thunderstorms. Clouds also impact satellite imagery, remote sensing, and computer modeling, influencing the accuracy of weather forecasts and climate predictions. In another embodiments, the fog refers to a meteorological phenomenon characterized by a dense concentration of water droplets or ice crystals suspended in the air at or near the Earth's surface. Fog is a ground-level cloud formed by the condensation of water vapor, while clouds typically form at higher altitudes in the atmosphere. It typically reduces visibility to less than 1 kilometer. Fog significantly impacts numerous human activities, including shipping, travel, and warfare, as well as autonomous systems like autonomous vehicles and tasks related to computer vision. In yet another embodiments, the rain refers to a meteorological event characterized by the falling of liquid water droplets from clouds towards the Earth's surface. It is a crucial component of the Earth's water cycle, providing moisture essential for plant growth and replenishing freshwater sources. Rainfall occurs when water vapor in the atmosphere condenses into droplets heavy enough to overcome air resistance and fall to the ground. The intensity and duration of rain can vary widely, from light drizzles to heavy downpours, and its occurrence is influenced by factors such as temperature, humidity, and atmospheric pressure. Rain reduces visibility and introduces distortions like blurring and artifacts, posing challenges for accurate object detection and recognition in computer vision tasks. In some embodiments, the smoke consists of particles and gases emitted into the atmosphere through combustion processes such as burning wood, coal, or fossil fuels. It is a form of air pollution with detrimental effects on both human health and the environment. Smoke contains a mixture of pollutants including particulate matter, carbon monoxide, volatile organic compounds, and other toxic substances. Smoke reduces visibility and introduces image degradation, complicating object detection and recognition in computer vision tasks. Based on the selected specialized dehazer, the dehazing system may process the input image and pass it through the selected specialized dehazer. As depicted at block 310, the selected specialized dehazer may run inference on the input hazy image and dehaze the image accordingly. Further, at block 312, the final output which is a clear dehazed image is ready for further tasks. For example, the dehazed image is subsequently ready for use in a range of applications, including surveillance and various computer vision tasks like object detection, segmentation, and context analysis. Accordingly, the dehazing system of the present disclosure is flexible and the number of pre-defined models, the intensity levels, number of classifiers, and the types of haze can be adjusted as per the users' requirements and target application domains. This flexibility may allow for a more tailored approach to image dehazing, potentially improving the quality of dehazed images and enhancing the performance of various image processing and computer vision applications.

Figure 4:
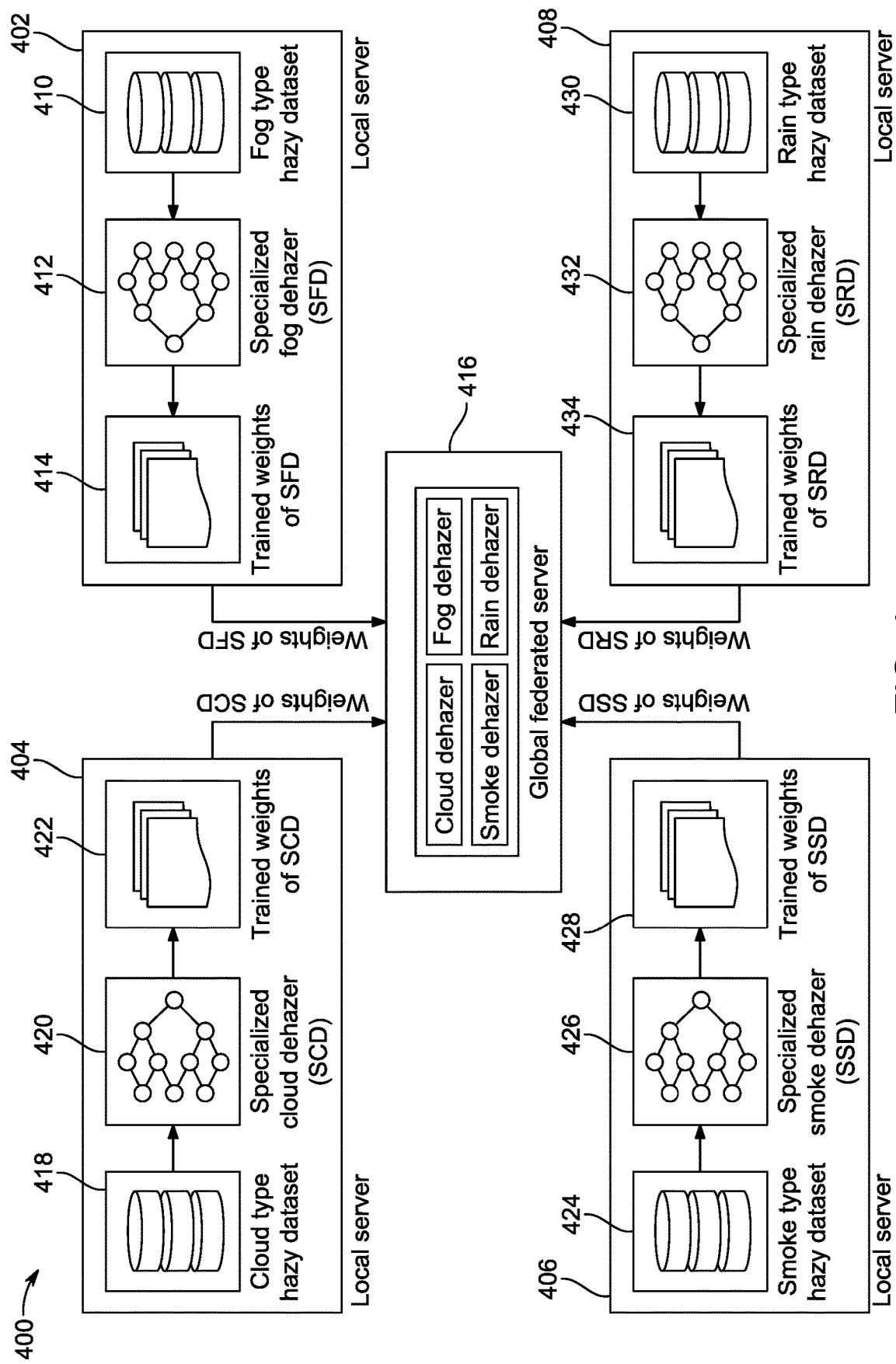
FIG. 4 depicts a process of incorporating federated learning technique of the dehazing system, according to certain embodiments.

FIG. 4 depicts a process 400 of incorporating federated learning technique of the dehazing system, according to certain embodiments. The process 400 as depicted in FIG. 4 illustrates the integration of federated learning into the training of specialized dehazers for different haze types. The process 400 is segmented into four sections, each representing a distinct haze type and the corresponding specialized dehazer training process. As illustrated in FIG. 4, the specialized dehazers for specific haze types can be trained separately from different local servers without sharing the data globally and only sharing the weights of the specialized models.

As depicted in FIG. 4, the process 400 may involve multiple local servers, such as local server 402, local server 404, local server 406, and local server 408. The local server 402 may relate to Fog Type Haze. The local server 402 may include a fog type haze dataset 410. The local server 402 may further include specialized fog dehazers (SFD) 412. The SFD 412 may be understood as specialized dehazers which are trained using the fog type haze dataset 410. Based on the training, certain weights are associated with each SFD 412. These weights are stored in the local server 402 as trained weights 414. The trained weights 414 of the SFDs 412 are transferred to a global federated server 416. Further, the local server 404 includes a cloud type haze dataset 418. The local server 404 may further include specialized cloud dehazers (SCD) 420. The SCD 420 may be understood as specialized dehazers which are trained using the cloud type haze dataset 418. Based on the training, certain weights are associated with each SCD 420. These weights are stored in the local server 404 as trained weights 422. The trained weights 422 of the SCDs 420 are transferred to the global federated server 416.

In addition, the local server 406 may relate to Smoke Type Haze. The local server 406 may include a smoke type haze dataset 424. The local server 406 may further include specialized smoke dehazers (SSD) 426. The SSD 426 may be understood as specialized dehazers which are trained using the smoke type haze dataset 424. Based on the training, certain weights are associated with each SSD 426. These weights are stored in the local server 406 as trained weights 428. The trained weights 428 of the SSDs 426 are transferred to the global federated server 416. Furthermore, the local server 408 includes a rain type haze dataset 430. The local server 408 may further include specialized rain dehazers (SRD) 432. The SRD 432 may be understood as specialized dehazers which are trained using the cloud type haze dataset 430. Based on the training, certain weights are associated with each SRD 432. These weights are stored in the local server 408 as trained weights 434. The trained weights 434 of the SRDs 432 are transferred to the global federated server 416. Each section illustrates the federated learning cycle where local servers contribute to the overall model by training specialized dehazers with local data and sharing the model improvements without exchanging the raw data itself. This strategy ensures data privacy protection in cases where the data is sensitive. In this way, the user can train the specialized dehazers on different types of haze images locally without sharing the data globally.

Figure 5:
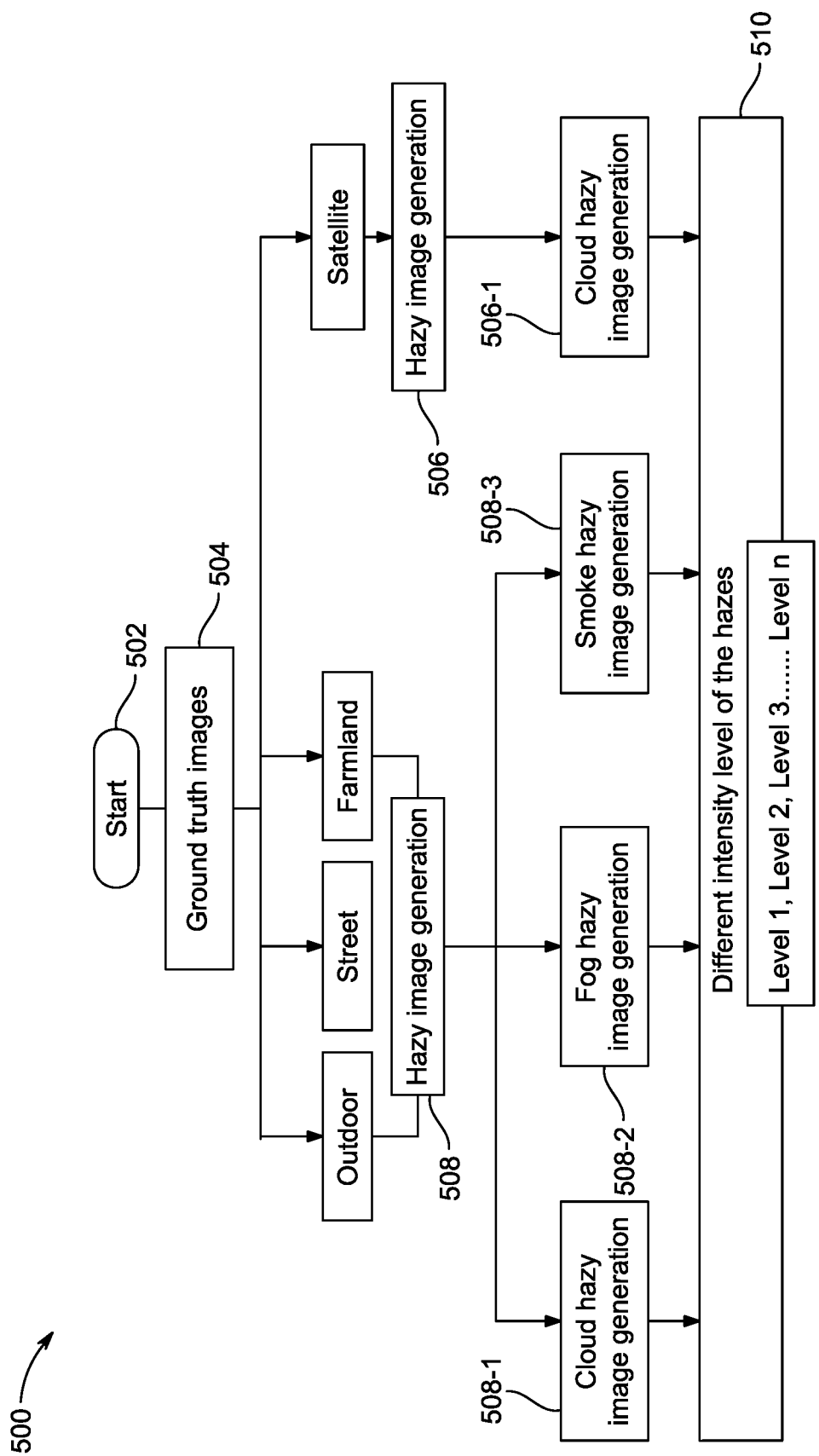
FIG. 5 depicts a flowchart of the methodology for generating hazy images, according to certain embodiments.

FIG. 5 depicts a flowchart 500 of the methodology for generating hazy images, according to certain embodiments. The flowchart 500 illustrates the methodology for generating hazy images with varying intensity levels and types. The flowchart 500 initiates at the start step 502 which is the initial step in the process of generating hazy images. At step 504, the flowchart 500 includes selection of ground truth images from different scenes, such as satellite, farmland, street, and outdoor. Thereafter, at step 506, the flowchart 500 includes, for each scene, a hazy image generation step is performed. Based on the hazy images, the flowchart 500 leads to the creation of images with different types of haze, including fog haze, smoke haze, and cloud haze, as depicted at step 508. Subsequently, for each haze type, the flowchart 500 includes a step 510 of generating images with different intensity levels of the haze, labeled as Level 1, Level 2, and Level 3. In an example, Level 1 may indicate low intensity of haze, Level 2 may indicate medium intensity of haze, and Level 3 may indicate high intensity of haze. The final output of this process is a comprehensive dataset of hazy images, which includes a variety of scenes, haze types, and intensity levels, which can be used for training convolutional neural network models in image dehazing systems. As shown in FIG. 5, each ground truth image consists of "n" numbers of haze intensities. So, creating a dataset following this approach features a highly diverse dataset with various scenes, haze types, and intense levels.

Figure 6:
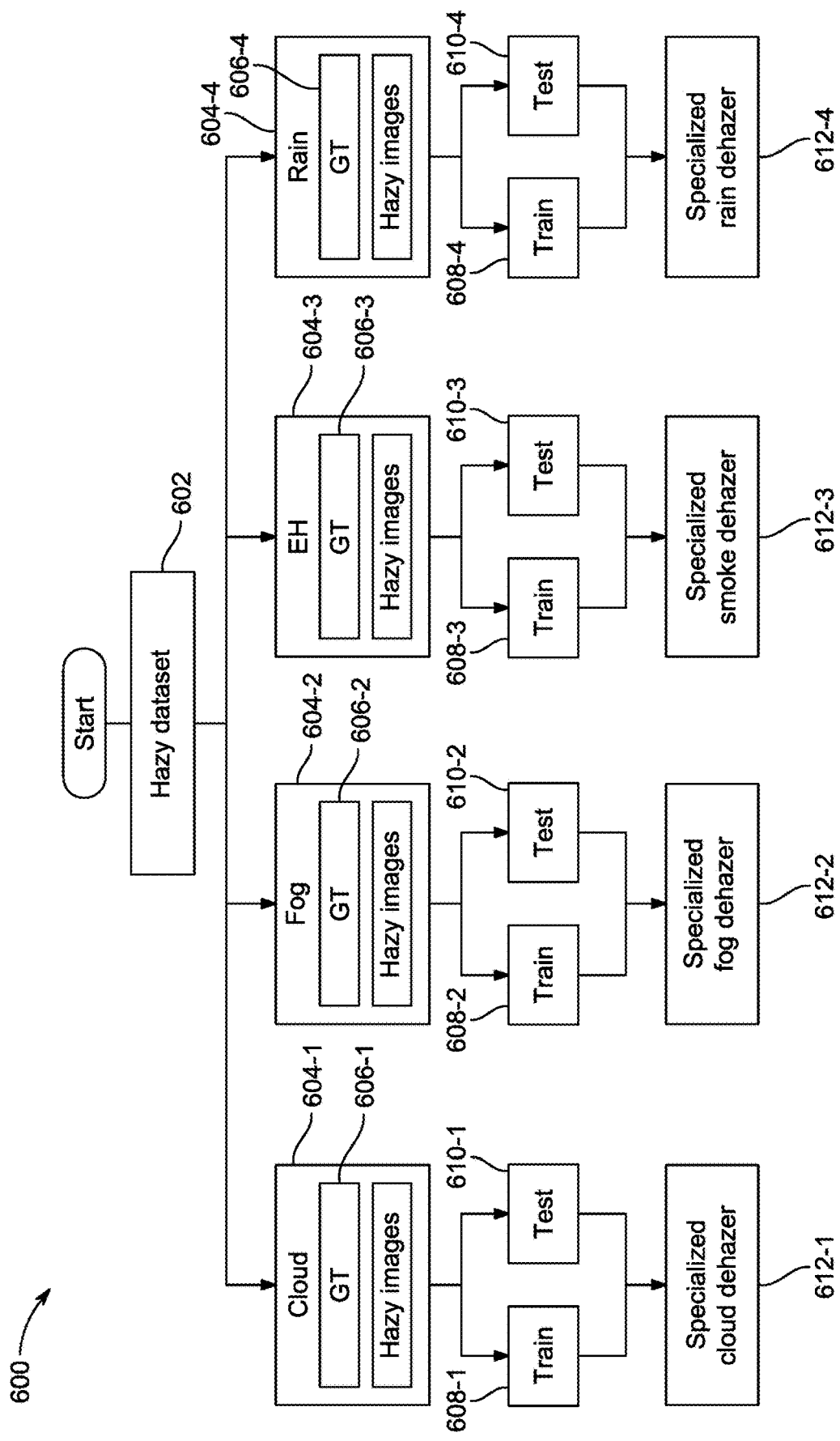
FIG. 6 illustrates a method for training and evaluating specialized dehazing algorithms tailored for specific haze types, according to certain embodiments.

FIG. 6 illustrates a method 600 for training and evaluating specialized dehazing algorithms using a hazy image dataset. The method 600 begins at step 602 by obtaining hazy dataset. At step 604, the hazy dataset is split into a different type of haze, namely, Cloud, Fog, Environmental Haze (EH), and Rain. For each haze type, the method 600 involves separating Ground Truth (GT) images from hazy images at step 606. Thereafter, the method 600 includes a training phase 608 and a testing phase 610. In the training phase 608, the dehazing algorithms are trained using the ground truth images. In the testing phase 610, the performance of the trained dehazing algorithms is evaluated. At step 612, the trained models are used as specialized dehazers for each respective haze type. The relationships between the elements indicate a sequential process where the hazy dataset is used to train and test specialized dehazers tailored for specific haze conditions, ultimately leading to the development of dehazing algorithms that are configured for Rain, EH, Fog, and Cloud haze types.

Figure 7:
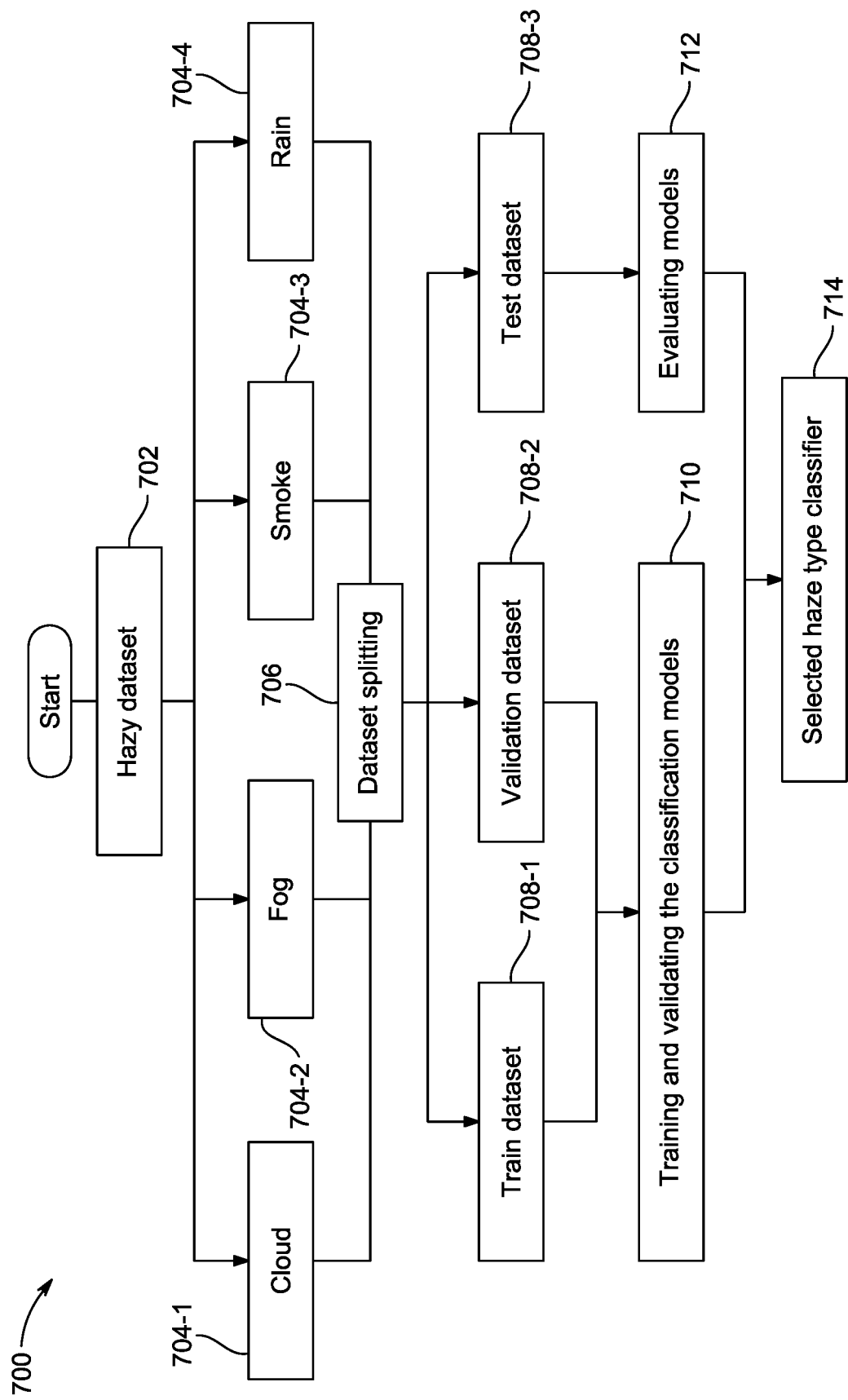
FIG. 7 illustrates an exemplary method for training and selecting optimal models for haze-type classification, according to certain embodiments.

FIG. 7 illustrates an exemplary method 700 for training and selecting for haze-type classification, according to certain embodiments. The method 700 includes step 702 comprising obtaining hazy dataset that may be used for training classifiers. The hazy dataset may be divided into different haze types such as Rain, Smoke, Fog, and Cloud, as depicted in step 704. The method 700 further includes a step 706 comprising dataset splitting. Dataset splitting includes dividing the dataset into training, validation, and test datasets, as depicted in step 708. The method 700 next moves to training and validating classification models at step 710. The step 710 includes the process of training classifiers and validating their performance. The trained classifiers are evaluated in step 712 based on the test dataset. Based on the evaluation and training, at step 714, a haze type classifier is selected. The classifier that is chosen based on its performance to classify haze types in images. Following rigorous testing against a designated test dataset, the most effective models for classifying haze types are identified. Furthermore, the dataset's rich diversity in haze conditions enables the development of specialized dehazers tailored to distinct types of haze, such as cloud, fog, environmental haze (EH), rain, and smoke, as demonstrated in FIG. 7.

Figure 8:
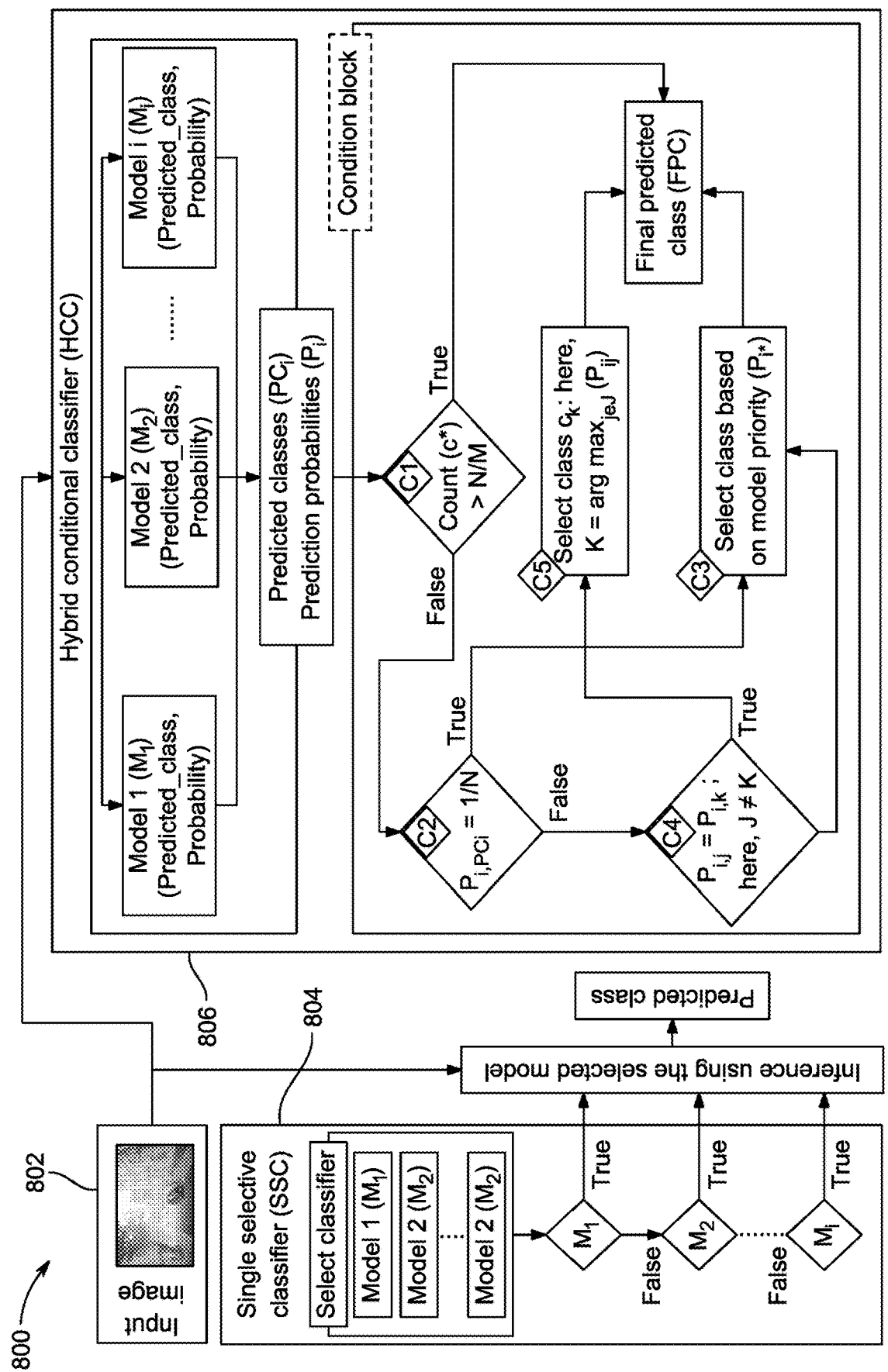
FIG. 8 depicts an architecture of two distinct frameworks within a dehazing system, according to certain embodiments.

FIG. 8 depicts an architecture 800 of two distinct frameworks within a dehazing system. The architecture 800 incorporates analyzing and processing the input image 802 by two distinct classification strategies: the Single Selective Classifier (SSC) 804 and the Hybrid Conditional Classifier (HCC) 806. The SSC 804 offers a user-friendly method for selecting among pre-trained classification models. So, if the user selects SSC 804 for classifying the haze class in the input image, the system will only classify based on a single model, which the user can also define. Conversely, the HCC method 806 employs the "I" number of classification models to deduce the haze type present in an image. This process involves running the input image through "M" number of models $\{M_1, M_2, \ldots, M_i\}$ recording both the predicted haze classes ($PC_i$) and their corresponding probabilities ($P_i$), as depicted in FIG. 8 with their notations being described in TABLE I.

TABLE I

Notations used in the
Hybrid Conditional Classifier (HCC) in the present disclosure

| Notations | Description |
|---|---|
| N | Total number of classes |
| M | Total number of models |
| $P_i$ | Vector of predicted probabilities from the $i^{th}$ model for N classes. $i \in \{1, 2, 3, \ldots, M\}$ |
| $PC_i$ | Predicted class by the $i^{th}$ model |
| C | Set of all possible classes, denoted as $\{C_1, C_2, \ldots, C_N\}$ |
| Count (C*) | Frequency of predictions for class c* |
| J | Set of indices corresponding to the predicted classes $\{PC_1, PC_2, \ldots, PC_N\}$ |
| i* | Index of the model that meets a specific selection criterion, such as highest accuracy. |
| k | Index of a class within a set C that meets a specific condition, like highest probability |

The present disclosure applies a reasoning mechanism that considers the predicted classes and probabilities to determine the most accurate haze type classification, guided by a set of predefined conditions as mathematically noted in FIG. 8. The conditions for the reasoning that are presented in TABLE II are described as follows:

TABLE II

Conditions used in the present disclosure for reasoning the predicted class in the Hybrid Conditional Classifier (HCC) model.

| Notations | Description |
|---|---|
| Condition 1 (C1) | Predicted Class Frequency Exceeding Average |
| Condition 2 (C2) | Uniform Prediction Probability |
| Condition 3 (C3) | Model Preference Based on Accuracy |

TABLE II-continued

Conditions used in the present disclosure for reasoning the predicted class in the Hybrid Conditional Classifier (HCC) model.

| Notations | Description |
|---|---|
| Condition 4 (C4) | Even Number of Classes with Non-Uniform Probabilities |
| Condition 5 (C5) | Highest Probability Selection Across Models |

Condition 1 (C1): This condition focuses on instances where a class (c*) is predicted more frequently than what would be expected under a uniform distribution of predictions across classes. The mathematical expression for C1 is as follows:

$$\text{Count}(c^*) = \frac{N}{M}$$

Here, N is the number of classes and M is the number of models. The Count (c*) sets a threshold for recognizing when a class is disproportionately favored by the models. If the C1 becomes true, then the final predicted class is c*.

Condition 2 (C2): If condition C1 is not satisfied, then in some instances, models may predict each class with an equal probability, denoted by (1/N). This uniform prediction probability scenario assumes equal confidence across all classes and models, simplifying the prediction landscape. The following condition ensures that each model's prediction for its chosen class ($PC_i$) adheres to this uniform probability.

$$P_{i,PC_i} = \frac{N}{M}$$

Here, $P_i$, $PC_i$ is the prediction probability for the predicted class $PC_i$ by the model i. If condition 2 is true then the system processes to the condition 3, otherwise to the condition 4.

Condition 3 (C3): In scenarios where multiple classification models are deployed, selecting the most likely class from a set of predictions is a common challenge. To address this, a condition was introduced in the system where the class with the highest predicted probability across all models is chosen. This method leverages $P_i$, the vector of predicted probabilities from each model i and $PC_i$, and the predicted class by each model to identify the Final Predicted Class (FPC) that exhibits the maximum probability among the predicted classes (C). The selection criterion is mathematically expressed as follows:

$FPC=C_k$; such that $k=\text{argmax}_{j \in J}(P_{i,j})$;

This ensures that the chosen class reflects the highest confidence level across the ensemble of model predictions.

Condition 4 (C4): Diversity in prediction probabilities often reflects the complexity and variability inherent in classification tasks, especially when the value of N is even and can be divided into two groups. This condition highlights scenarios where prediction probabilities ($P_{i,j}$) are not uniform across classes, allowing for a nuanced understanding of model predictions. The non-uniformity, captured by $P_{i,j} \neq P_{i,k}; \forall j,k \in \{1,2,\ldots,N\}, j \neq k$ underscores the importance of considering individual class probabilities in the decision-making process, facilitating a more detailed and informed approach to class selection based on model outputs. If C4 is true then the system processes with condition 5, otherwise it processes with condition 3.

Condition 5 (C5): When considering the reliability of multiple models, prioritizing predictions based on model accuracy is a strategic approach. This condition stipulates that FPC should be the one identified by the most accurate model ($A_i$), where it is the index of the model with the highest accuracy. This prioritization acknowledges the variability in model performance and leverages $A_i$, the accuracy metric, to guide the selection process. The chosen class for the C5 is as follows:

$$FPC=PC_i$$

Thus, emerges from a model that has demonstrated superior predictive abilities, ensuring that the decision-making process is influenced by the most reliable model predictions available while all the prior four conditions are not satisfied.

Integrating each of these conditions as shown in FIG. 8 provides a framework for interpreting and utilizing predictions from M numbers of classification models, offering strategies that range from leveraging collective model confidence to acknowledging the nuances of model accuracy and prediction patterns. These approaches enhance the robustness and reliability of decision-making processes of our invention.

Figure 9:
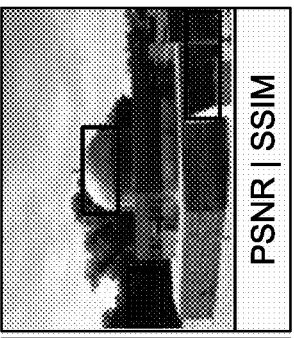
FIG. 9 depicts a visual comparison of dehazed images using the LD_Net, GD_Net and the SD_Net, against various hazy images, according to certain embodiments.

FIG. 9 depicts a visual comparison 900 of dehazed images using the LD_Net, GD_Net and the SD_Net, against various hazy images, according to certain embodiments. In an example, a set of hazy images and their dehazed results are given in FIG. 9. The visual comparison 900 provides the PSNR and SSIM values are provided for each example, with the highest-performing model's metrics emphasized in bold. The GT Image column shows the ground truth for reference, demonstrating the dehazing quality and the practical application of the framework disclosed in this invention.

Figure 10:
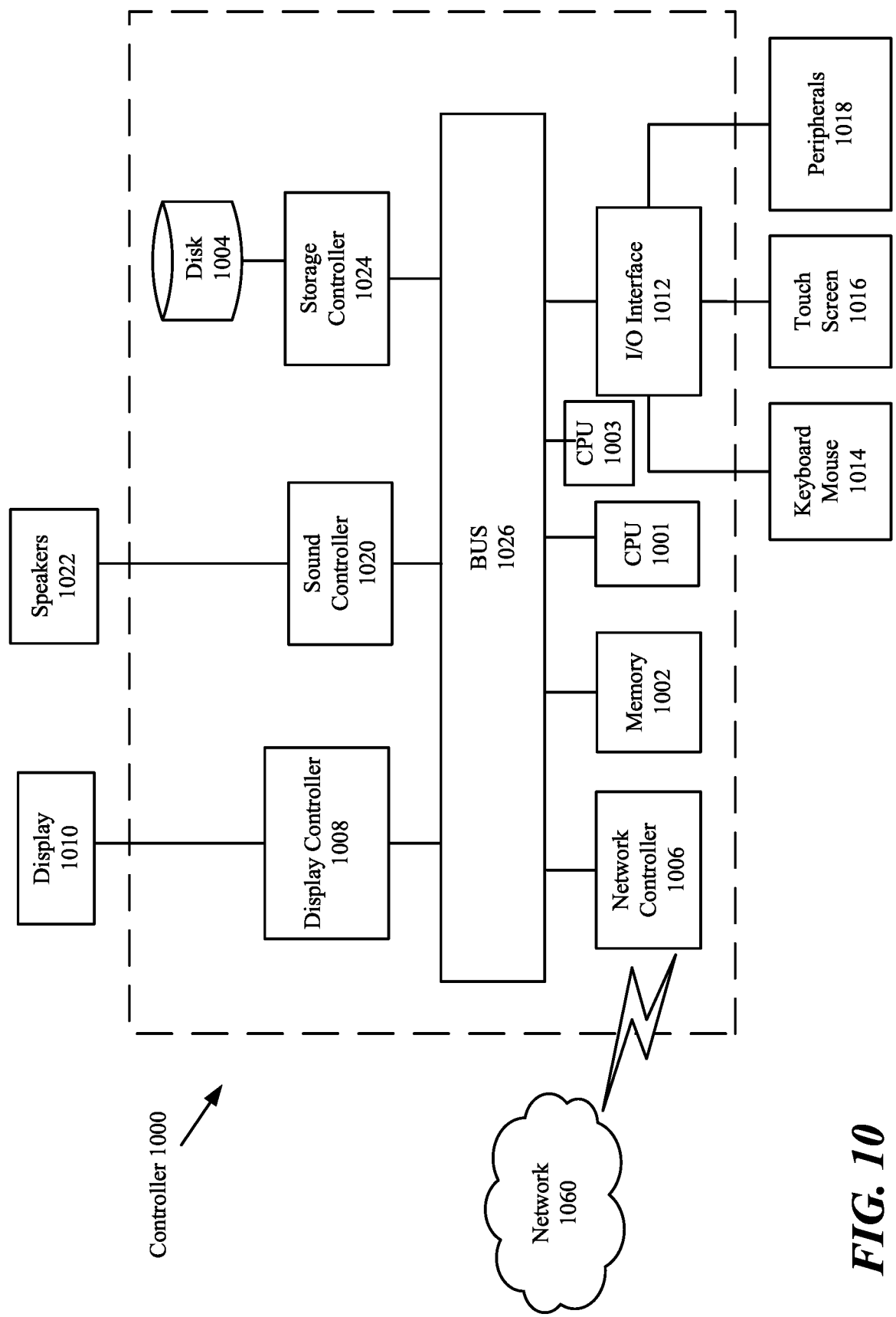
FIG. 10 is an illustration of a non-limiting example of details of computing hardware used in the computing system, according to certain embodiments.

Next, further details of the hardware description of the computing environment according to exemplary embodiments is described with reference to FIG. 10. In FIG. 10, a controller 1000 is described is representative of the system 102 of FIG. 1 in which the controller is a computing device which includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1001, 1003 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 1003 may be implemented on an FPGA, ASIC, PLD or using discrete logic circuits, as one of ordinary skill in the art would recognize. Further, CPU 1001, 1003 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
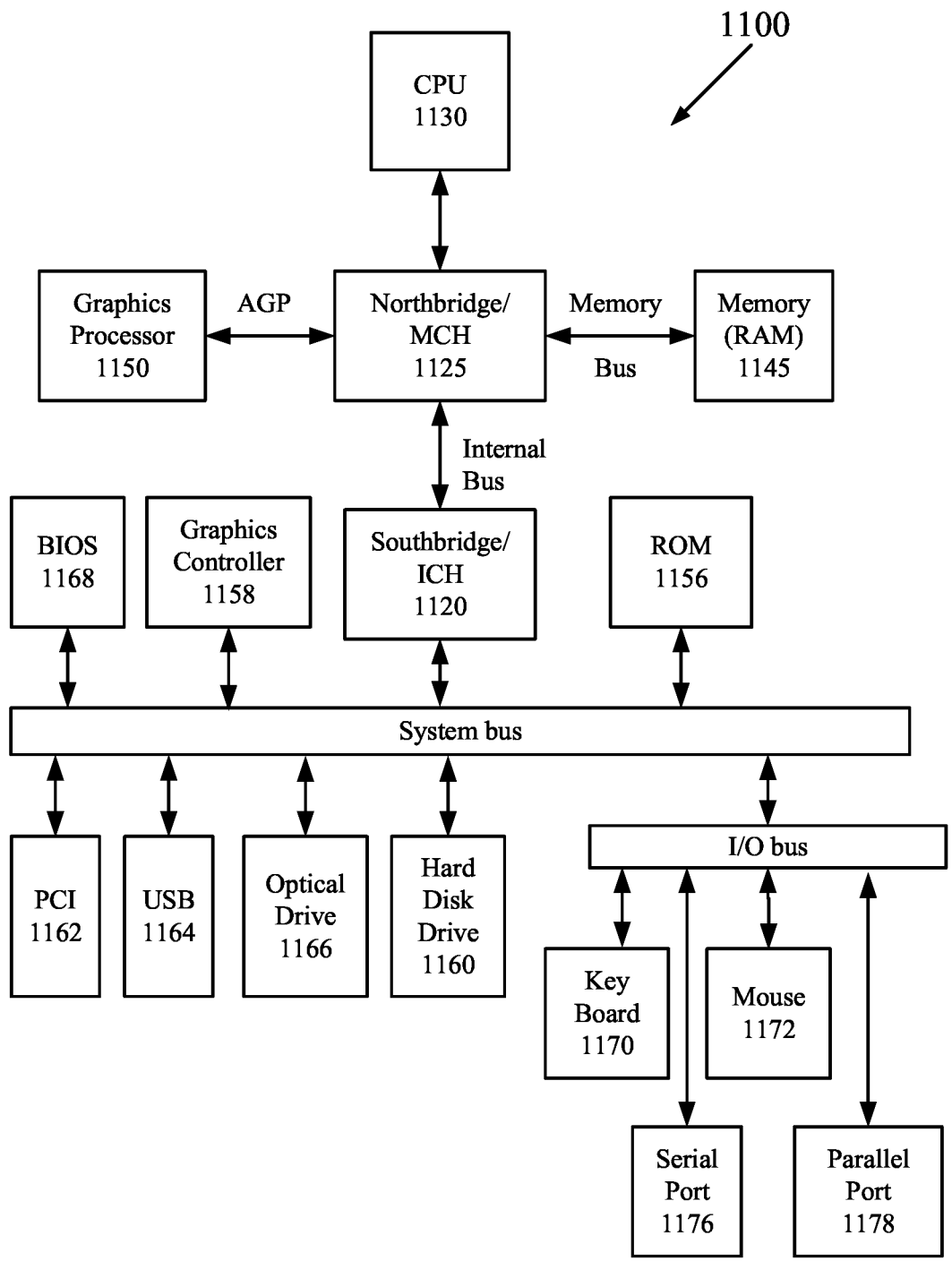
FIG. 11 is an exemplary schematic diagram of a data processing system used within the computing system, according to certain embodiments.

FIG. 11 shows a schematic diagram of a data processing system, according to certain embodiments, for performing the functions of the exemplary embodiments. The data processing system is an example of a computer in which code or instructions implementing the processes of the illustrative embodiments may be located.

In FIG. 11, data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
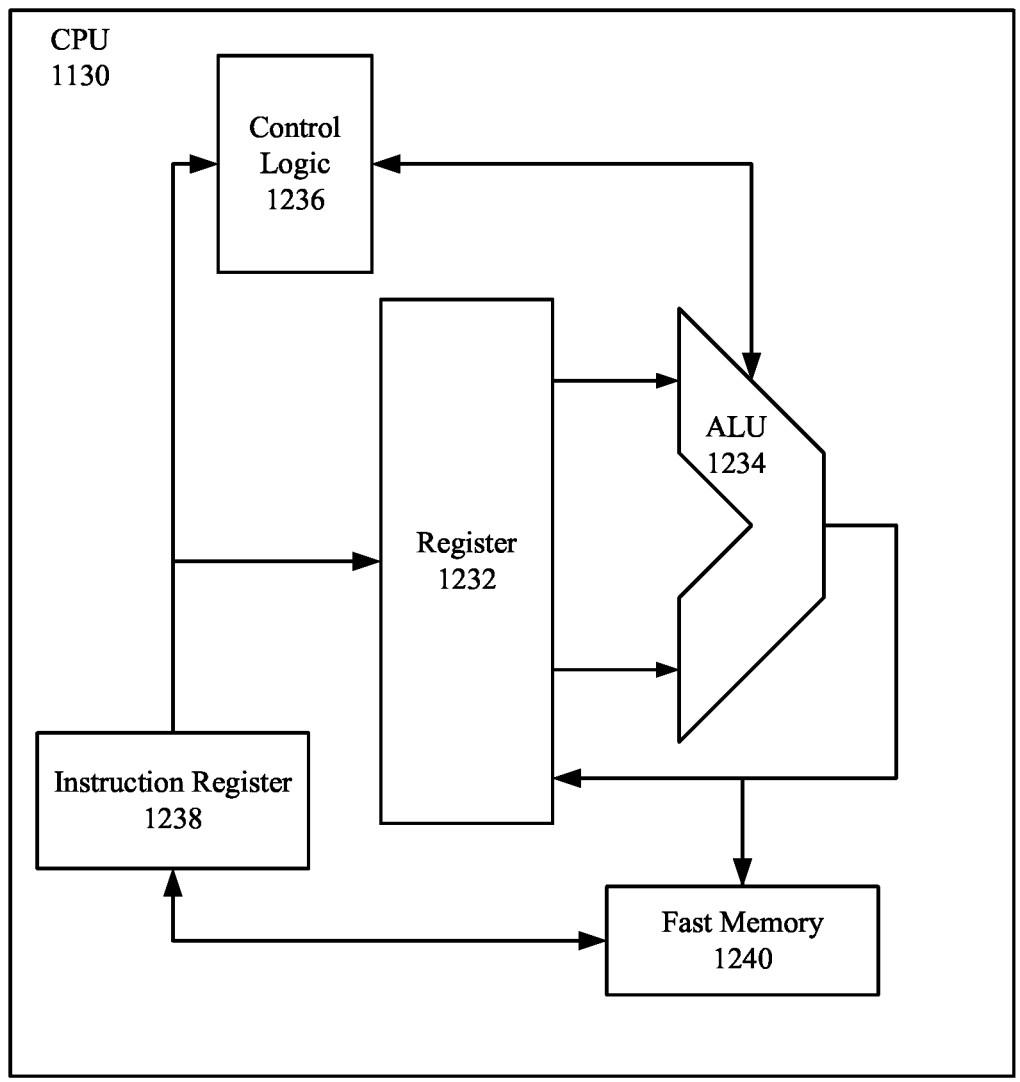
FIG. 12 is an exemplary schematic diagram of a processor used with the computing system, according to certain embodiments.

For example, FIG. 12 shows one implementation of CPU 1130. In one implementation, the instruction register 1238 retrieves instructions from the fast memory 1240. At least part of these instructions are fetched from the instruction register 1238 by the control logic 1236 and interpreted according to the instruction set architecture of the CPU 1130. Part of the instructions can also be directed to the register 1232. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain implementations, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1188 through a PCI bus 1162.

The PCI devices may include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
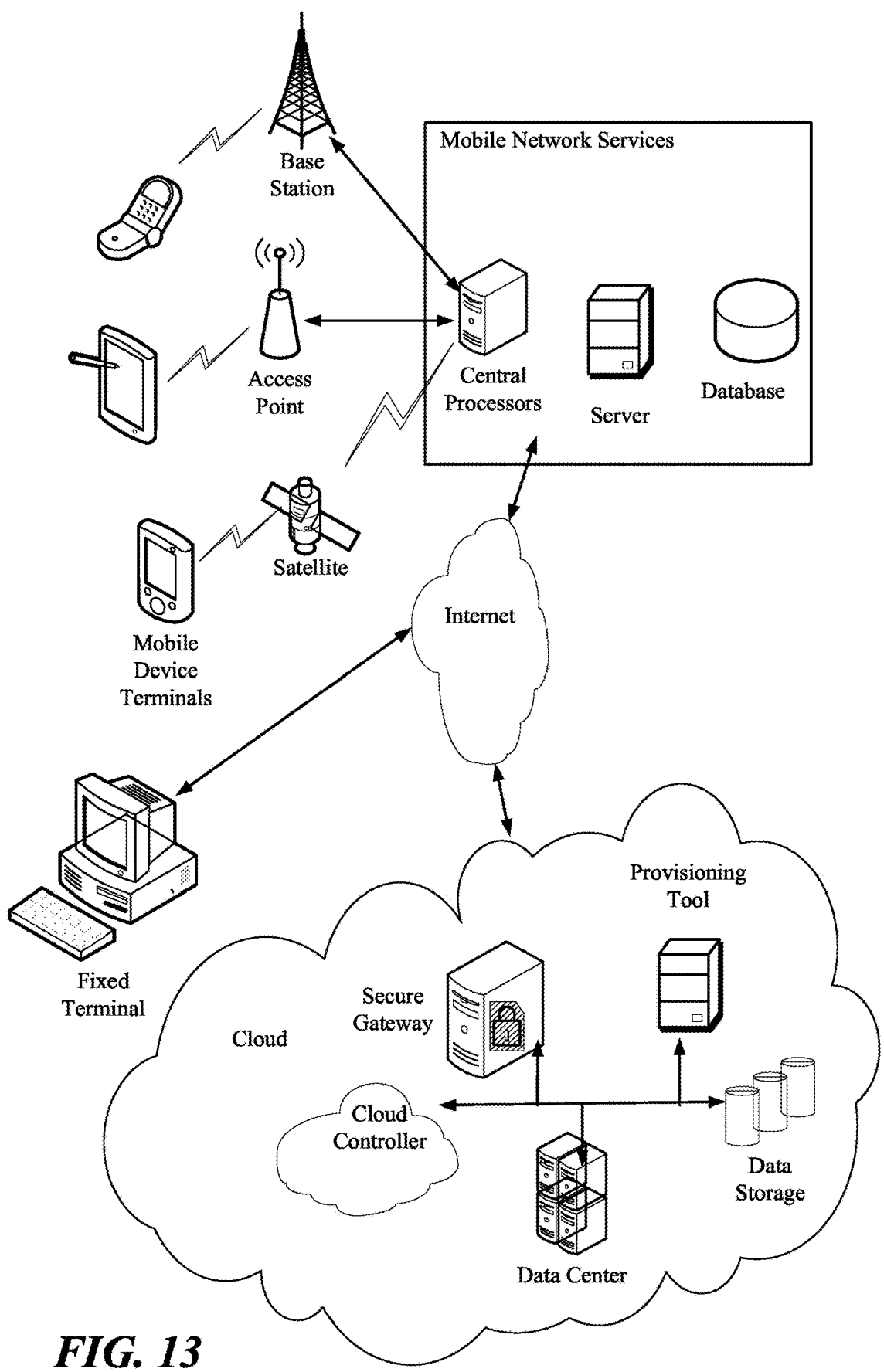
FIG. 13 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A method of dehazing an image having a haze condition and a haze-type class, comprising:
   creating a plurality of image sets by splitting a plurality of ground truth images, wherein the plurality of image sets includes an outdoor image set, a street image set, a farmland image set, and a satellite image set;
   transitioning each image set of the plurality of image sets by overlaying a synthetic haze condition to obtain a hazy dataset including a plurality of transitioned hazy images having a plurality of haze conditions, wherein the synthetic haze condition includes a haze intensity level;
   training a plurality of haze-type classifier models and a plurality of specialized dehazer models with the hazy dataset;
   determining a classifier model from the plurality of haze-type classifier models based on a classifier selector, wherein the classifier selector is a hybrid conditional classifier (HCC);
   processing the image in accordance with a requirement of each haze-type classifier model of the plurality of haze-type classifier models to obtain a processed image;
   determining the haze-type class of the image by the classifier model based on the processed image with the classifier model selected from the plurality of haze-type classifier models;
   determining a dehazer from the plurality of specialized dehazer models based on the haze-type class; and
   dehazing the image by removing the haze condition with the dehazer.

2. The method of claim 1, wherein the plurality of haze conditions of the plurality of transitioned hazy images includes a cloud, a fog, an environmental haze, and a rain, wherein the environmental haze includes a carbon emission, a wildfire smoke, and a cloud.

3. The method of claim 2, wherein the plurality of haze conditions of the plurality of transitioned hazy images in the outdoor image set, the street image set, and the farmland image set further includes a smoke condition.

4. The method of claim 3, wherein the plurality of specialized dehazer models includes a cloud dehazer, a fog dehazer, an environmental haze dehazer, a smoke dehazer, and a rain dehazer.

5. The method of claim 1, wherein the determining the classifier model further comprises:
- generating an HCC information including a first vector set containing predicted classes, a second vector set containing prediction probabilities, a number of classes (N), and a number of haze-type models (M) for each haze-type classifier model of the plurality of haze-type classifier models with the inference;
- passing the HCC information for each haze-type classifier model of the plurality of haze-type classifier models through a condition block to obtain a final predicted class; and
- selecting the final predicted class as the classifier model.

6. The method of claim 5, wherein the condition block comprises a first condition block, a second condition block, a third condition block, a fourth condition block, and a fifth condition block.

7. The method of claim 6, wherein the first condition block having a first condition of is configured to:
- pass the HCC information for each haze-type classifier model of the plurality of haze-type classifier models to the first condition block;
- determine whether the first condition is satisfied for each haze-type classifier model of the plurality of haze-type classifier models;
- in response to the determining whether the first condition is satisfied, when the first condition is satisfied, pass the HCC information for each haze-type classifier model of the plurality of haze-type classifier models to the third condition block;
- in response to the determining whether the first condition is satisfied, when the first condition is not satisfied, pass the HCC information for each haze-type classifier model of the plurality of haze-type classifier models to the second condition block;
- wherein the first condition is represented by a first equation of $$\text{Count } C^* = \frac{N}{M},$$

wherein the C* represent the haze-type class.

8. The method of claim 7, wherein the second condition block having a second condition is configured to:
- determine whether the second condition is satisfied for each haze-type classifier model of the plurality of haze-type classifier models;
- in response to the determining whether the second condition is satisfied, when the second condition is satisfied, pass the HCC information for each haze-type classifier model of the plurality of haze-type classifier models to the third condition block;
- in response to the determining whether the second condition is satisfied, when the second condition is not satisfied, pass the HCC information for each haze-type classifier model of the plurality of haze-type classifier models to the fourth condition block;
- wherein the second condition is represented by a second equation of $$P_{i,PC_i} = \frac{1}{N},$$

wherein the $P_{i,PC_i}$ represents the prediction probabilities, wherein the i is a first haze-type classifier model index and $PC_i$ is a predicted class of an $i^{th}$ haze-type classifier model.

9. The method of claim 8, wherein the third condition block is configured to determine the final predicted class based on the second vector of the HCC information.

10. The method of claim 8, wherein the fourth condition block having a fourth condition is configured to:
- determine whether the fourth condition is satisfied for each haze-type classifier model of the plurality of haze-type classifier models;
- in response to the determining whether the fourth condition is satisfied, when the fourth condition is satisfied, pass the HCC information for each haze-type classifier model of the plurality of haze-type classifier models to the fifth condition block;
- in response to the determining whether the fourth condition is satisfied, when the fourth condition is not satisfied, pass the HCC information for each haze-type classifier model of the plurality of haze-type classifier models to the third condition block;
- wherein the fourth condition is represented by a third equation of $P_{i,j} \neq P_{i,k}$, wherein the j is a first predicted class index and k is a second predicted class index and wherein j≠k.

11. The method of claim 10, wherein the fifth condition block is configured to determine the final predicted class based on an accuracy of the plurality of haze-type classifier models.

12. The method of claim 1, wherein the image is obtained from an autonomous vehicle having a camera or from a surveillance camera.

* * * * *

UNITED STATES PATENT AND TRADEMARK OFFICE
CERTIFICATE OF CORRECTION

| | |
|---|---|
| PATENT NO. | : 12,217,398 B1 |
| APPLICATION NO. | : 18/658673 |
| DATED | : February 4, 2025 |
| INVENTOR(S) | : Md Tanvir Islam et al. |

Page 1 of 1

It is certified that error appears in the above-identified patent and that said Letters Patent is hereby corrected as shown below:

On the Title Page

Item (72), in "Inventors", Line 1, for Inventor Md Tanvir Islam, delete "Riyadh (SA)" and insert -- Seoul (KR) --.

Item (72), in "Inventors", Line 2, for Inventor Ik Hyun Lee, delete "Riyadh (SA)" and insert -- Seoul (KR) --.

Item (72), in "Inventors", Line 6, for Inventor Khan Muhammad, delete "Riyadh (SA)" and insert -- Seoul (KR) --.

Signed and Sealed this
Seventeenth Day of June, 2025

Coke Morgan Stewart
*Acting Director of the United States Patent and Trademark Office*